Jan. 26, 1965        H. K. RICHTER        3,167,658
APPARATUS FOR USE IN SENSING THE PULSE
Filed July 17, 1961        2 Sheets-Sheet 1
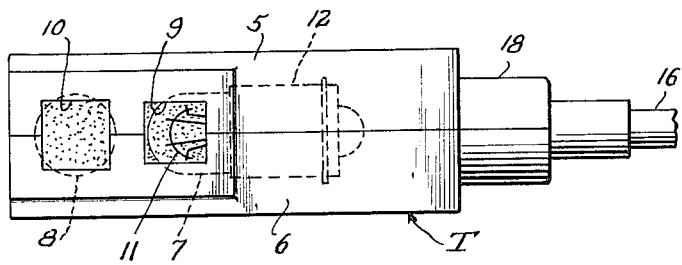
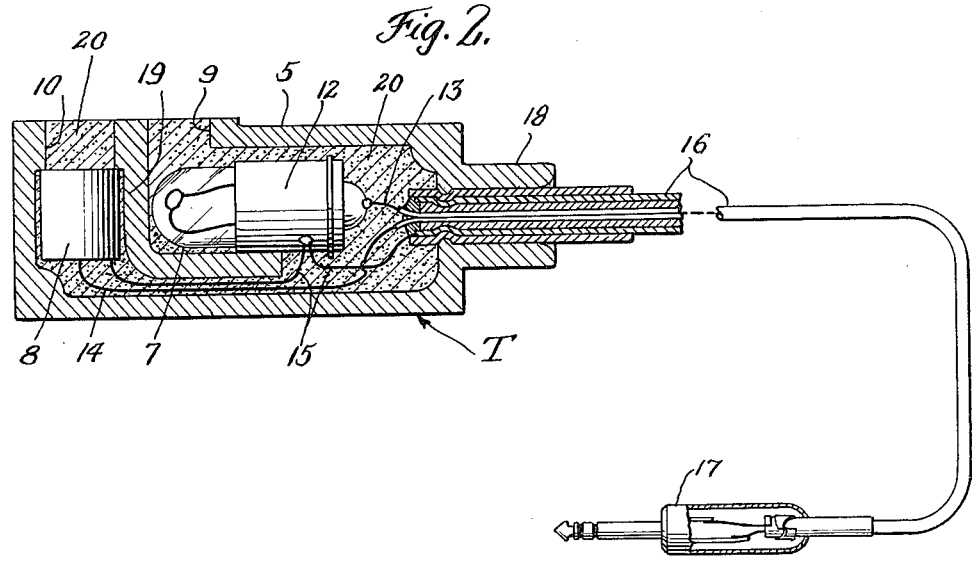
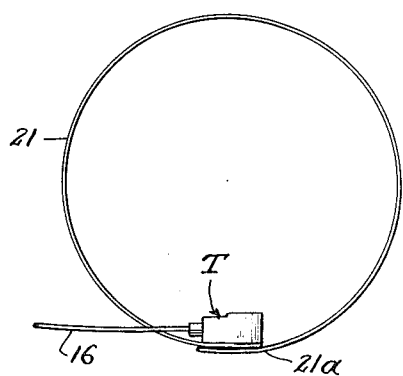
INVENTOR
Harold Kenneth Richter
BY
ATTORNEYS Jan. 26, 1965   H. K. RICHTER   3,167,658
APPARATUS FOR USE IN SENSING THE PULSE
Filed July 17, 1961   2 Sheets-Sheet 2

INVENTOR
Harold Kenneth Richter
BY
ATTORNEYS

United States Patent Office 3,167,658
Patented Jan. 26, 1965

3,167,658
APPARATUS FOR USE IN SENSING THE PULSE
Harold Kenneth Richter, Willow Grove, Pa., assignor to Air-Shields, Inc., Hatboro, Pa., a corporation of Delaware
Filed July 17, 1961, Ser. No. 124,728
4 Claims. (Cl. 250—239)

This invention relates to apparatus for use in sensing the pulse, for instance for use in taking or reading the pulse rate, and the invention is especially concerned with a transducer adapted to be applied to a body surface so as to sense the pulse and develop a signal corresponding to the pulse.

While the apparatus of the invention is adapted for use in connection with either animals or humans, the arrangement is particularly well suited to use in sensing the human pulse. The transducer of the invention is adapted to sense the pulse in a wide variety of parts and areas of the body, even including relatively flat areas, for instance the forehead which I have found to be a particularly effective area from which to take the pulse, for reasons which will be explained more fully hereinafter.

The device of the invention is of the kind employing a light source such as an electric light bulb, and a photosensitive call arranged so that light from the source enters the body and passes therefrom to the photocell to develop a signal which will fluctuate according to the flow of blood in the area or portion of the body with which the device is associated.

Certain devices of this general kind have been known in which the light source and the photocell were adapted to be positioned at opposite sides of some part of the body, for instance at opposite sides of a finger or ear lobe, the passage of light through that part of the body from the light source to the photocell fluctuating in accordance with the flow of blood through the part and thereby developing a signal fluctuating in accordance with the pulse. Devices of this prior kind are subject to certan difficulties. On the one hand if the device is used upon a finger or other readily or frequently moved part, it is subject to the motion of the part and it has been found that such motion either influences the flow of blood in the part, or tends to introduce inaccuracy in the action of the transducer, frequently to such an extent as to impair the accuracy of the reading obtained or to introduce artifacts or spurious signals, confusing the reading obtained. On the other hand, if the device is applied to a part such as the ear lobe which is not as subject to motion as are the fingers, it has been found that the pulse itself is so weak in the ear lobe that excessive amplification of the signal obtained is required in order to obtan a reading. Moreover, even a part such as the ear lobe is also subject to certain motions which may introduce spurious response, and since the amplification must be very high when using the ear lobe, even minor disturbances in the position or action of the transducer may result in artifacts of sufficient relative magnitude to be disturbing to the reading.

One of the principal objects of the present invention is to overcome difficulties of the character referred to above, and according to the present invention this is accomplished by providing a device which is particularly well adapted to the sensing of the pulse in certain more or less flat areas of the body, for instance, in the forehead, in which region of the body I have found that the pulse is of good strength and further that artifacts or spurious response due to motion effects is reduced to a minimum.

The device of the present invention is specially constructed to facilitate application to the forehead or to other more or less flat areas of the body and sensing the pulse in that region of the body, and the invention further makes provision for fastening the device to that region of the patient or other person on whom the transducer is used.

How the foregoing objects and advantages are attained, together with others which will occur to those skilled in the art, will appear more fully from the following description taken in connection with the accompanying drawing, in which:

FIGURE 1 is a plan view of a transducer constructed according to the present invention;

FIGURE 2 is a sectional view through the device shown in FIGURE 1, the plane of the section being at right angles to the view of FIGURE 1, FIGURE 2 also including an illustration of a cable connection for the transducer device;

FIGURE 3 is a view on a reduced scale illustrating the transducer of FIGURES 1 and 2 and a mounting means therefor by which the transducer may be fastened to the forehead of the patient;

Figure 4:
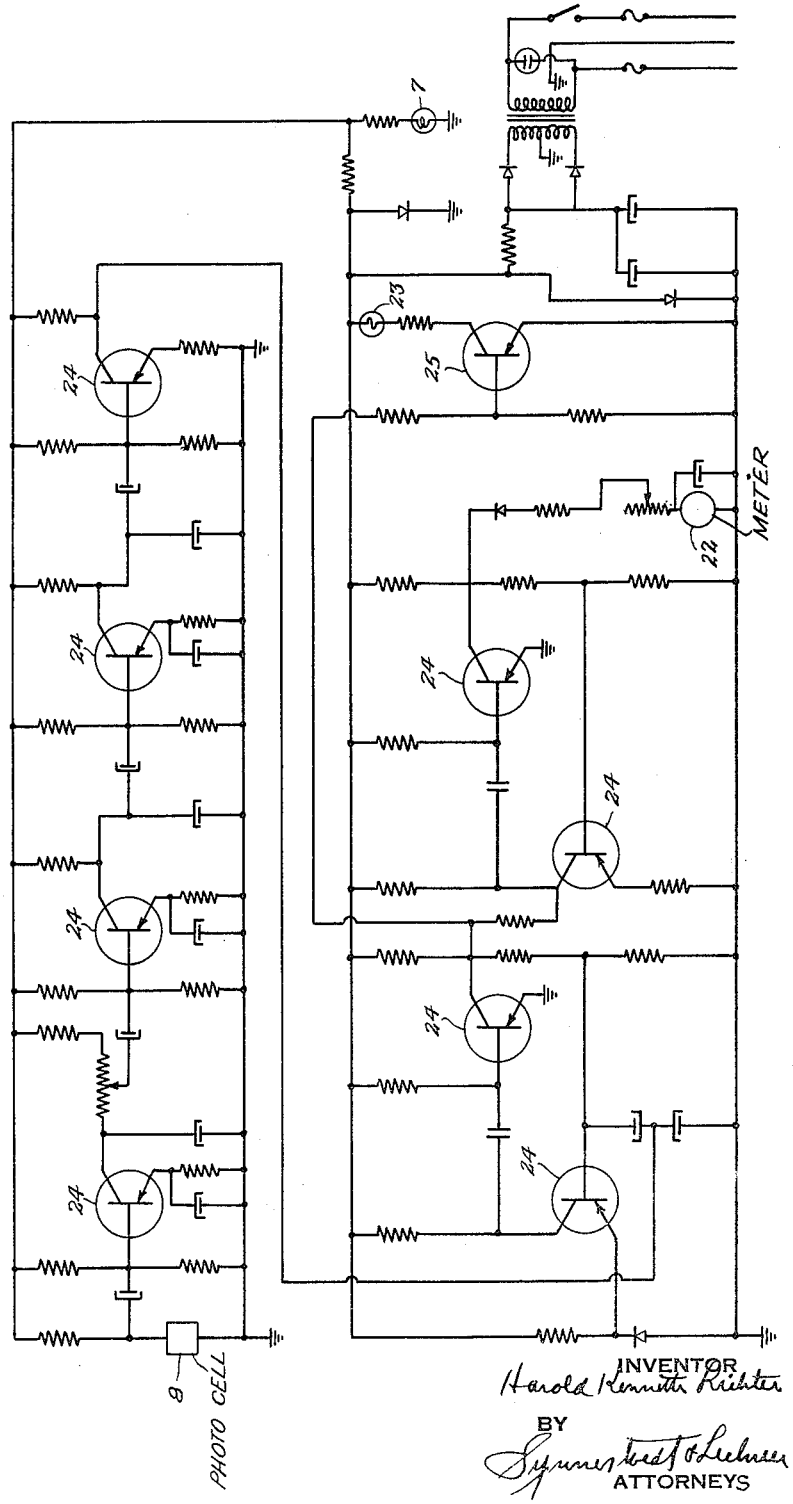
FIGURE 4 is a schematic wiring diagram of one form of amplifier or electrical indicating apparatus with which the transducer of the invention may be employed in order to give pulse rate readings according to the pulse sensed by the transducer.

Referring first to FIGURES 1 and 2, the transducer T there shown comprises a shell or casing, desirably made up of two mirror image half parts 5 and 6. These may be made of a suitable plastic, as by molding and are shaped to provide an interior hollow in which the light source 7 and photocell 8 are received. The casing parts 5 and 6 have, at one side or surface thereof, i.e., the side or surface which is viewed in FIGURE 1, apertures which, in effect, constitute "windows" 9 and 10 through which the light source and the photocell are optically exposed. The transducer T as a whole comprises a somewhat elongated rectangular structure of relatively small size, for instance of the order of an inch to an inch and a half long.

The light source comprises a small electric bulb having a filament such as indicated at 11, the bulb having a base or socket 12 which is mounted within the interior hollow of the casing of the transducer. The light bulb is desirably positioned, as is plainly indicated in FIGURE 1, so that the filament 11 has an appreciable span of its length exposed through the window 9.

With further reference to the light source, it is contemplated that the light bulb or light source be adapted to emit light toward the visible end of the infrared region. This is desirably accomplished by the employment of a small incandescent light bulb operated on a voltage considerably lower than that for which the bulb is normally rated. For example a small flash light type of incandescent bulb rated for use on 12 to 14 volts may be employed and with such a bulb it should be operated on a voltage of from about 4 to 4½ volts, in order to concentrate the emission toward the visible end of the infrared range.

Both the light source and the photocell are provided with connections 13, 14 and 15 which are coupled with conductors in the cable 16 having a plug 17 associated therewith by means of which the device may be connected with a suitable indicating device or circuit, such as shown in FIGURE 4. The cable 16 enters the casing of the transducer through the neck portion 18 which is arranged at one end of the device and also at one end of the interior hollow in which the light source and photocell are mounted.

The interior hollow of the casing is divided by a partition indicated in FIGURE 2 at 19, and the light source with its base, and the photocell, are respectively mounted in the two portions of the interior hollow as divided by the partition 19. Each of these units is encased in a plastic or resin material such as indicated at 20. This material desirably comprises a transparent or clear epoxy type of resin, the transparency of this material providing for the optical exposure of these units through the respective windows 9 and 10 provided therefor. The arrangement of the bulb and the photocell is preferably such as to provide for complete encapsulating or potting of these units in the epoxy or other transparent resin material used. This is of importance with respect to the light bulb, because it provides a safety feature. If, for any reason, the envelope of the bulb should break or crack, or if any short circuit or loose connection should develop within the transducer housing, the fact that the interior parts are completely encapsulated will prevent contact of any explosive gases which may be present with any heated elements such as the heated filament of the bulb. On the other hand, the fact that the photocell is completely encapsulated is a protection to the photocell itself. The encapsulating of the interior elements of the device also effectively waterproofs the device and in addition contributes good mechanical stability to the bulb and cell and to the associated wiring, which is of importance especially because of the small size of the parts and wiring.

The partition 19 dividing the interior hollow into the separate cavities for the light source and the photocell is advantageously opaque in order to optically obscure the photocell from the light source within the transducer. Similarly, it is desirable that the casing parts 5 and 6 be formed or molded of opaque material, so that the only optical access to the interior is through the two windows 9 and 10. Thus, the window 9 serves for the projection of light out of the unit and the window 10 serves for the reception of light into the unit.

By arranging the transducer unit in the manner above referred to, when the side or surface of the transducer having the windows 9 and 10 is brought into contact with a surface of the body, light from the light source 7 penetrates the body sufficiently to reflect a measurable amount of light back into the transducer to the photocell. The pulsations of the blood in the reflecting tissues act to vary the reflection of light, and in this way, the amount of light reaching the photocell fluctuates in timed relation to the body pulse. The fluctuation of the light received by the photocell produces a signal, the nature of which will vary according to the kind of photosensitive cell used. Although a photoelectric cell may be employed, in which event the signal comprises a voltage developed by the cell, I prefer to employ a photosensitive cell of the type in which the electrical resistance changes according to light variations. This type of cell is known as a photosensitive or photoconductive cell, and this is the type of cell illustrated in the drawings and for which the circuit of FIGURE 4 is arranged. Cable 16 is provided for associating the device with indicating apparatus, as is mentioned more fully herebelow in connection with FIGURE 4.

The arrangement of the transducer device as has already been described hereinabove enables use of the device on certain body surfaces on which various of the prior known devices are not adapted for use. For example the device of the present invention is well adapted to application to the forehead of the patient. In the forehead area or region the pulse effect is a relatively strong one and in addition there is little tendency for body motions to shift the position of the transducer when it is applied to the forehead, this being true even if the head of the patient is turned from side to side. When used in this way, the introduction of spurious signals is minimized. The invention therefore also contemplates arrangement of the device for ready application to the forehead of the patient. This may be accomplished by an arrangement of the kind illustrated in FIGURE 3 in which the transducer is indicated in the outline by the letter T. Here the transducer is shown as mounted on the inner surface of a flexible head band 21, the transducer being located at one end of the band and the other end 21a being shown in the figure as overlapping the first end to which it may be secured in any suitable manner, for instance by a pressure sensitive adhesive. When the device is applied to the patient by means such as shown in FIGURE 3 the windows 9 and 10 are held against the forehead of the patient and the only light which can reach the photocell 8 is that which is reflected from the light source 7 by the tissues of the body.

Although, as above indicated, the transducer is very effectively used on the forehead it should also be kept in mind that the transducer may also be used on many other surfaces and parts of the body, which is a distinct advantage as compared with certain prior arrangements which were only adapted for use on parts of the body such as a finger or ear lobe through which light could be effectively transmitted. If it is desired to use the device on some part of the body other than the forehead, the fastening band can for example be placed around an arm or a leg.

The signal developed by the transducer when it is in use may be used in any of a variety of ways and in any of a variety of circuit devices for registering, indicating or signaling the pulse being taken. For example, as shown in FIGURE 4, the photocell 8 which as above mentioned is of the photosensitive type, is illustrated as connected in a transistorized circuit adapted to give a reading of pulse rate by means of the meter 22 which may be a microammeter calibrated in units corresponding to pulses per minute. The light source 7 is also shown in the schematic of FIGURE 4 and in addition there is another light indicated at 23 which is adapted to flash in synchronism with the pulses introduced into the system by the photocell in order to give a visual indication of the rate of the pulse being taken.

The specific values of the components and the specific arrangements of various parts of the circuit as shown in FIGURE 4 need not be considered in detail herein as these features do not consitute a part of the present invention per se. However, it may be mentioned that the circuit shown includes what may be termed two one-shot transistorized multivibrator circuits in tandem or series arranged to develop a current which is proportional to the rate of the pulses introduced into the circuit by the photocell, this current being fed to the meter 22. The flash signal bulb 23 will respond to the pulses of current delivered from the first of the two multivibrator circuits. In the circuits as shown, the transistors indicated at 24 may be of the type known as 2N1303 and the transistor indicated by the numeral 25 may be of the type known as 2N632.

I claim:

1. A transducer adapted for use in taking a pulse reading comprising a device unitarily incorporating a light source and a photocell and having a side face adapted to be placed in contact with a body surface, both said light source and said photocell being optically exposed through said one side face of the device, and an optical shield between the light source and the photocell, the shield having an edge portion extended substantially to the plane of said side face.

2. A transducer adapted for use in taking a pulse reading comprising a device unitarily incorporating a light source and a photocell and having a side face adapted to be placed in contact with a body surface, said device comprising an opaque structure having an interior hollow with a pair of side-by-side apertures constituting windows in said side face, a light source in said hollow positioned to project light out through one of said windows, a photocell in said hollow positioned to receive light passing in through the other of said windows, and an optical shield between the light source and the photocell, the shield having an edge portion extended substantially to the plane of said side face.

3. A construction according to claim 2 in which the light source and the photocell are set in light transmissive plastic material disposed in said windows between and through which the light from said source is projected and through which the light passing in to the photocell also passes.

4. A transducer adapted for use in taking a pulse reading comprising a device unitarily incorporating a light source and a photocell and having a side face adapted to be placed in contact with a body surface, said device comprising an opaque structure having an interior hollow with a pair of side-by-side apertures constituting windows in said side face, a light source in said hollow positioned to project light out through one of said windows, a photocell in said hollow positioned to receive light passing in through the other of said windows, and an opaque partition in said hollow lying between the light source and photocell therein and extended substantially to said side face.

References Cited in the file of this patent
UNITED STATES PATENTS

| | | |
|---|---|---|
| 2,540,163 | Brosene | Feb. 6, 1951 |
| 2,684,671 | Mendelsohn | July 27, 1954 |
| 2,756,741 | Campanella | July 31, 1956 |
| 2,790,438 | Taplin | Apr. 30, 1957 |
| 2,894,150 | Bopp | July 7, 1959 |
| 2,920,209 | Asten | Jan. 5, 1960 |
| 3,040,737 | Kompelien | June 26, 1962 |